United States Patent

[11] 3,554,397

| [72] | Inventor | John Verl Cluff |
| | | 841 W. Pine St., Meridian, Idaho 83642 |
| [21] | Appl. No. | 780,015 |
| [22] | Filed | Nov. 29, 1968 |
| [45] | Patented | Jan. 12, 1971 |

[54] SPARE TIRE LIFT AND CARRIER
2 Claims, 6 Drawing Figs.

[52] U.S. Cl.................................................. 214/451
[51] Int. Cl................................................ B62d 43/04
[50] Field of Search........................................ 214/451,
452, 453, 454, 85.5; 224/42.21, 42.23, 42.25;
296/37.2

[56] References Cited
UNITED STATES PATENTS
2,400,274  5/1946  Ullman........................ 214/85.5
2,775,358  12/1956  Renouf......................... 214/451
3,395,819  8/1968  Fruetel......................... 214/451

*Primary Examiner*—Hugo O. Schulz
*Attorney*—Wells and St. John

ABSTRACT: A spare tire carrier for flat bed vehicles comprises a pulley suspended beneath the bed against cross bars between the side frames that support the bed. A cable having a spare tire mounting bracket at one end threads through the pulley, then over one of the side frames to another pulley suspended beneath the bed, thence rearwardly to a winch on the rear bumper of the vehicle. The winch includes a flanged drum having a shaft rotatable by a lug wrench. One flange of the drum has apertures closely spaced around its periphery. The drum support has an aperture which is successively aligned with the drum flange apertures to receive a locking pin.

PATENTED JAN 12 1971

INVENTOR.
JOHN VERL CLUFF
BY
Wells & St. John
ATTYS.

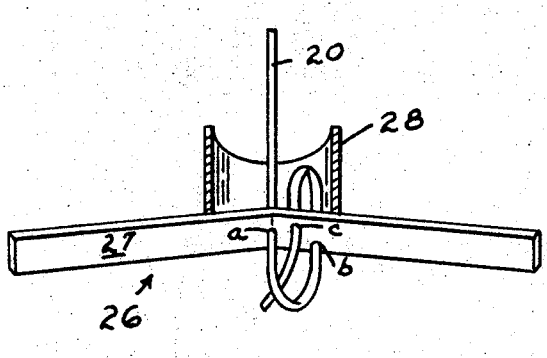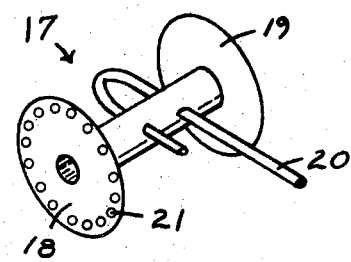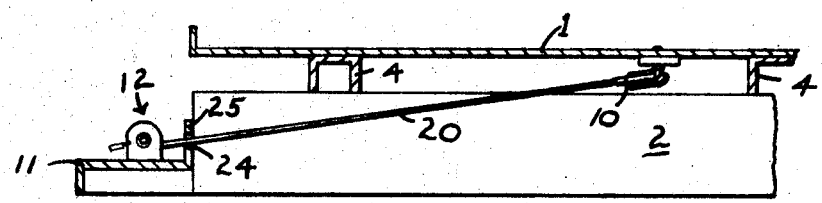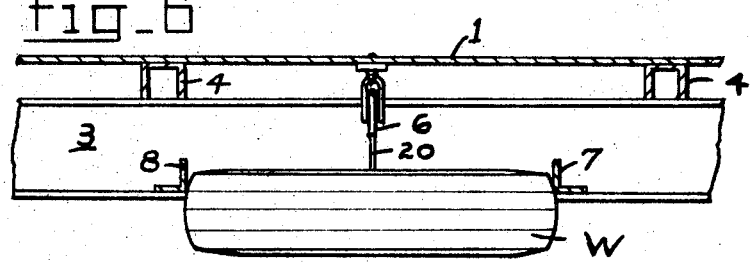

SPARE TIRE LIFT AND CARRIER

BACKGROUND OF THE INVENTION

In this application the term "spare" is used to designate the complete tire and rim and the inwardly extending means that secures the rim to the wheel hub on the vehicle.

The mounting of spare tires beneath the beds of automotive vehicles has been shown in various prior patents. Examples of such devices are found in U.S. Pat. No. 2,688,372, U.S. Pat. No. 2,325,848, U.S. Pat. No. 2,775,358 and U.S. Pat. No. 2,823,069.

PURPOSE OF THE INVENTION

The present device is a simple mechanism which utilizes simple parts that are readily applied to vehicles such as pickup trucks, and which enables the operator to take a spare tire from a position behind the vehicle, under the vehicle and up against supports in the under part of the vehicle body. It embodies a simple effective means to draw the tire against the body supports and lock it there secure against rattling, yet readily available when needed without the necessity of getting under the vehicle or releasing any latching devices under the vehicle.

The purpose of the invention therefore is to provide a spare tire carrier for automotive vehicles operable to mount and carry the tire under the vehicle bed and hold it under tension against displacement, the entire device comprising a winch operable by a lug wrench and mounted on the rear vehicle bumper, a cable, two pulleys having means to suspend them from the bed, two cross frames beneath the vehicle bed, a lock at the winch to hold the cable under tension and a simple tire carrying bracket insertable through the center hole of the tire to suspend the tire on the cable.

GENERAL DESCRIPTION

The preferred form of my invention is shown in the accompanying drawings wherein:

FIG. 3 is a detail view of the tire carrying bracket and its attachment to the cable;

FIG. 4 is a detail view of the cable drum;

FIG. 5 is a side view of the frame part of the vehicle with my invention thereon; and FIG. 6 is a sectional view on the line 6–6 of FIG. 1.

Figure 1:
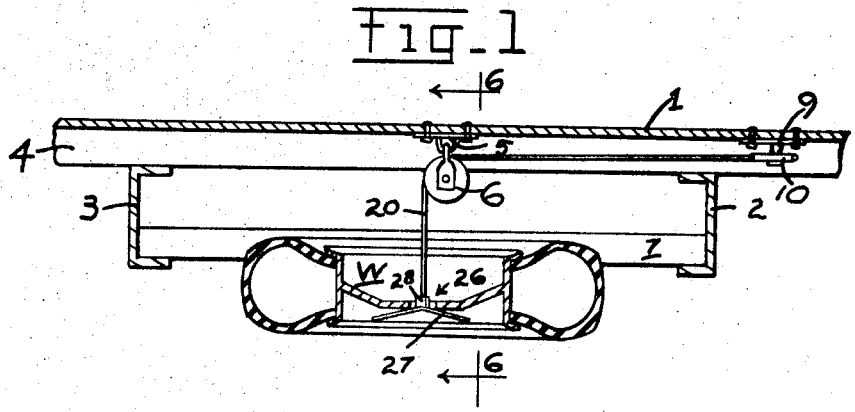
FIG. 1 is a cross-sectional view through the body of a vehicle showing my invention applied thereto.
Figure 2:
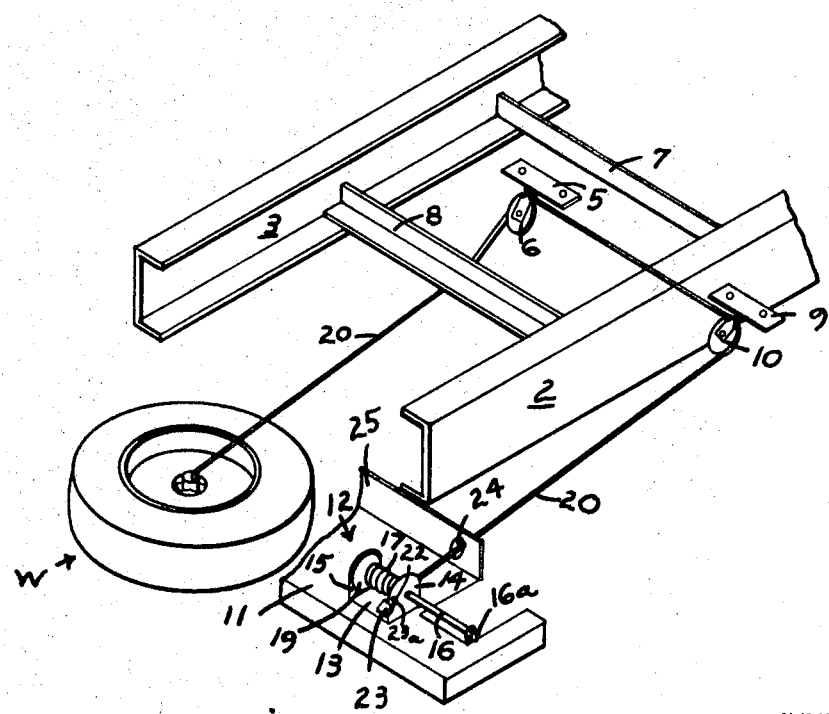
FIG. 2 is a somewhat diagrammatic perspective view showing the relative positions of the various parts of my invention.

Referring now in detail to the drawings, the vehicle is shown as having the usual bed 1 and two longitudinal side frame members 2 and 3, the bed being supported by cross bars 4 that are secured on the side frame members 2 and 3. One pulley mount 5 is bolted to the bed 1 and mounts a pulley 6 for swinging movement midway between the side frame members 2 and 3 as close as possible (usually 16—20 inches) to the rear ends of these members. Front and rear cross frame braces 7 and 8 are equally spaced from the mount 5 for the pulley 6 so that a spare tire W can be drawn up against them. A second pulley support 9 is bolted to the bed 1 just outside the frame member 2. A second pulley 10 is mounted for swinging movement to the support 9. As shown, the spare tire includes the rubber tube, the metal rim and the mounting flange.

On the rear bumper 11 of the vehicle is a winch 12 having a main frame 13. This frame 13 is U-shaped with upstanding supports 14 and 15 for the shaft 16 of the drum 17 of the winch 12. The shaft 16 has a hexagonal end 16a to receive a lug wrench, not shown. The drum 17 is affixed to the shaft 16 and has end flanges 18 and 19 to confine turns of a cable 20 thereon. The end flange 18 has a multiplicity of apertures 21 therein at spaced points about its periphery. The support 14 of the frame 13 has an aperture 22 positioned to register with each of the apertures 21 in turn as the drum 17 rotates. A locking device 23, such as a common padlock, has its loop 23a threaded through the aperture 22 and one of the apertures 21 to lock the drum 17 against rotation.

The cable 20 has one end secured to the drum 17 and extends through an opening 24 in the bumper flange 25. The cable 20 extends around the pulley 10, then between the bed 1 and the side frame member 2 to the pulley 6 and around it, then to the wheel W. A spare tire engaging bracket 26 is affixed to the free end of the cable and is of such configuration that it may be inserted through the central opening of the spare tire W. The bracket 26 is composed of a bar 27 bent at the middle to a broad V-shape with a short section 28 of two inch pipe at the center of the bar and welded to it. The cable 20 passes through an opening $a$ in the bar 27 along the center axis of the pipe 28 and then is looped through the two other openings $b$ and $c$ in the bar and tucked under the first loop in the cable between the openings $a$ and $b$.

With this device the spare tire W is always securely mounted under the bed 1 until needed. When the cable 20 is drawn taut by the winch 12 it draws the spare tire up between and against the braces 7 and 8 so that the rubber of the tire and the resiliency of the cable hold the spare tire so that it is substantially immovable. No auxiliary attaching means are needed. When the spare tire is needed the winch 12 is unlocked and the spare tire is lowered to the ground. Since it is close to the rear of the vehicle it can be released from the cable and used. The tire it replaces receives the bracket 26 so it can be lifted into place beneath the bed 1 and carried there until it is repaired. Since the pulley 6 can swing in its mounting, the tire can be pulled forward from behind the vehicle and then lifted.

I claim:

1. A spare tire lift and carrier attachment, comprising:
   a first pulley unit including a transverse pulley suspended from the vehicle bed along the longitudinal center line thereof midway between said frame members, said pulley unit being pivotally connected with respect to the bed about a transverse axis permitting the pulley to swing rearwardly or hang vertically from the bed with respect to said axis;
   a second pulley unit spaced transversely to one side of said first pulley unit, said second pulley unit being identically connected with respect to the bed about said transverse axis;
   a cable having one end secured to the winch for winding thereon;
   a winch fixed to the rear bumper of the vehicle in longitudinal alignment with said second pulley unit;
   a bracket fixed to the remaining end of the cable adapted to be inserted through the center of a spare tire assembly for vertically suspending the tire in a horizontal orientation;
   said cable being engaged over the pulleys intermediate its ends, whereby the cable centers a spare tire assembly suspended thereon with respect to the bed and serves to selectively hold the spare tire assembly against the cross braces for transport;
   a flanged cable drum forming part of said winch and having the cable wrapped thereon;
   said drum having a multiplicity of openings in one flange adjacent the periphery;
   a stationary bracket adjacent to said one flange provided with an opening registerable with successive openings in said one flange of the drum as the drum turns; and
   a rigid locking member selectively engaged by the stationary bracket and flange through the registered openings.

2. An attachment as defined in claim 1 wherein the cable drum is fixed to a transverse shaft extending outward therefrom toward one side of the bed and rotatably mounted about a transverse axis, said extension of said shaft terminating in a polygonal configuration complementary to a tire lug wrench, whereby the winch drum may be rotated by manual use of such wrench.